United States Patent
Eaton et al.

[19]

[11] Patent Number: 5,970,391
[45] Date of Patent: Oct. 19, 1999

[54] METHOD FOR A SUBSCRIBER UNIT TO COMPILE MESSAGE FRAGMENTS TRANSMITTED FROM DIFFERENT ZONES

[75] Inventors: Eric Thomas Eaton, Lake Worth; Von Alan Mock, Boynton Beach, both of Fla.

[73] Assignee: Motorola, Inc., Schaumburg, Ill.

[21] Appl. No.: 08/891,756

[22] Filed: Jul. 14, 1997

[51] Int. Cl.⁶ .................................................. H04B 1/00
[52] U.S. Cl. ........................... 455/59; 455/503; 455/517
[58] Field of Search ..................................... 455/503, 432, 455/436, 31.1, 31.2, 59, 38.1, 466, 502, 422; 340/825.44; 370/394, 474, 331, 332, 428; 371/36, 43.6, 43.8

[56] References Cited

U.S. PATENT DOCUMENTS

| | | | |
|---|---|---|---|
| 4,835,777 | 5/1989 | Deluca et al. | 371/69 |
| 4,912,756 | 3/1990 | Hop | 455/506 |
| 4,956,641 | 9/1990 | Matai et al. | 340/825.44 |
| 5,254,986 | 10/1993 | DeLuca | 340/825.44 |
| 5,384,565 | 1/1995 | Cannon | 340/825.44 |
| 5,390,362 | 2/1995 | Modjeska et al. | 455/31.2 |
| 5,497,508 | 3/1996 | George | 455/32.1 |
| 5,574,975 | 11/1996 | Hill | 455/503 |
| 5,590,126 | 12/1996 | Mishra et al. | 455/436 |
| 5,590,403 | 12/1996 | Cameron et al. | 455/503 |
| 5,594,945 | 1/1997 | Lewis et al. | 455/38.1 |
| 5,625,351 | 4/1997 | Willard et al. | 340/825.52 |
| 5,634,198 | 5/1997 | Cameron et al. | 455/63 |
| 5,657,357 | 8/1997 | Jones et al. | 375/347 |
| 5,745,481 | 4/1998 | Phillips et al. | 370/313 |
| 5,898,385 | 4/1999 | Makino | 340/825.44 |
| 5,915,210 | 6/1999 | Cameron et al. | 455/59 |

*Primary Examiner*—Doris H. To
*Assistant Examiner*—Charles N. Appiah
*Attorney, Agent, or Firm*—Philip P. MacNak

[57] ABSTRACT

Subscriber units (14) can roam from zone (A) to zone (B) and accurately compile fragments of a message that includes fragments transmitted from both zones. Preferably, a subscriber unit (14) assigns different markers to fragments received from different zones. When the subscriber unit senses that a received message includes fragments from different zones, it correlates a number of characters of a fragment received from one zone (A) to a similar number of characters in a fragment received from a different zone (B). If a complete match is not found, the fragments are combined as part of a message. If a match is found, a further comparison looks for additional matches between fragments and, finding such additional matches, erases one copy of duplicate characters.

13 Claims, 5 Drawing Sheets

FIG. 1

| MSG. NO. | CH. ID | MESSAGE |
|---|---|---|
| 1 | A | THE REPORT IS READY |
| 1 | B | REPORT IS READY FOR YOUR SIG. |
| 2 | B | CALL HOME |

*FIG. 4*

RECEIVED FRAGMENTS

METHOD FOR A SUBSCRIBER UNIT TO COMPILE MESSAGE FRAGMENTS TRANSMITTED FROM DIFFERENT ZONES

FIELD OF THE INVENTION

This invention is directed to selective call receivers, and particularly to selective call receivers that are adapted to receive messages as they roam from one coverage zone to another coverage zone.

BACKGROUND OF THE INVENTION

In a typical RF (Radio Frequency) messaging system, messages are transmitted to one or more selective call receivers (or transceivers) that are subscribed to the system. These subscribing selective call receivers (or transceivers) are referred to herein as SU's (Subscriber Units).

When a long message is to be transmitted to a SU, the message is divided into numbered fragments before it is transmitted. The fragments are then transmitted sequentially, and the addressed SU appends each received fragment to an immediately preceding fragment to compile a complete message for the user of the SU.

A SU is typically permitted to roam, i.e., to move from one coverage zone to another zone. When the SU is in a first zone, it receives messages on a first channel; when the SU moves to a different zone, the SU receives messages on a different channel. A potential problem arises when the SU receives one or more fragments of a long message while it is in the first zone, and then moves to a second zone before receiving the complete message. If the communication system is aware of which fragments were received by the SU while it was in the first zone, the system can instruct a base station transmitter in the second zone to send the remaining fragments of the message. In this manner, no fragments are missed by the SU, and no duplicate fragments are transmitted.

In a two-way messaging system where the SU can receive and transmit information, the SU transmits an acknowledgment (ACK) each time it receives a complete fragment. Thus, the messaging system knows which fragments have or have not been received by the SU. When this SU roams to a different zone, the remaining fragments can be sent to the SU as described above.

The problem of roaming is not so easily cured in a one-way messaging system. In a one-way system, the SU only receives; it does not transmit. The system provides coverage for multiple zones by placing a base station transmitter in each zone, with the transmitters simulcasting on different channels. That is, the same message (identified by the same message number) is transmitted by each base station transmitter on its own channel, but these transmissions are not synchronized with each other. The message may be transmitted in one zone seconds or minutes later than the same message is transmitted in another zone.

Fragment size can also vary from zone to zone. Even though infrastructure equipment in each zone divides the message to be simulcast into similarly numbered fragments, fragment size can vary from zone to zone, depending on the message traffic in a zone.

Considering the above-mentioned differences that occur from zone to zone, and the fact that the one-way messaging system cannot know which fragments were actually received by an addressed SU, one can appreciate that there can be no assurance that a roaming SU will receive a complete message, and similarly, no assurance that the roaming SU has not received some duplicate information.

What is needed therefore, is a method for a SU to receive multiple fragments of a message transmitted from different zones and assemble those fragments into a complete message without duplication of information.

DESCRIPTION OF THE PREFERRED EMBODIMENT

Figure 1:
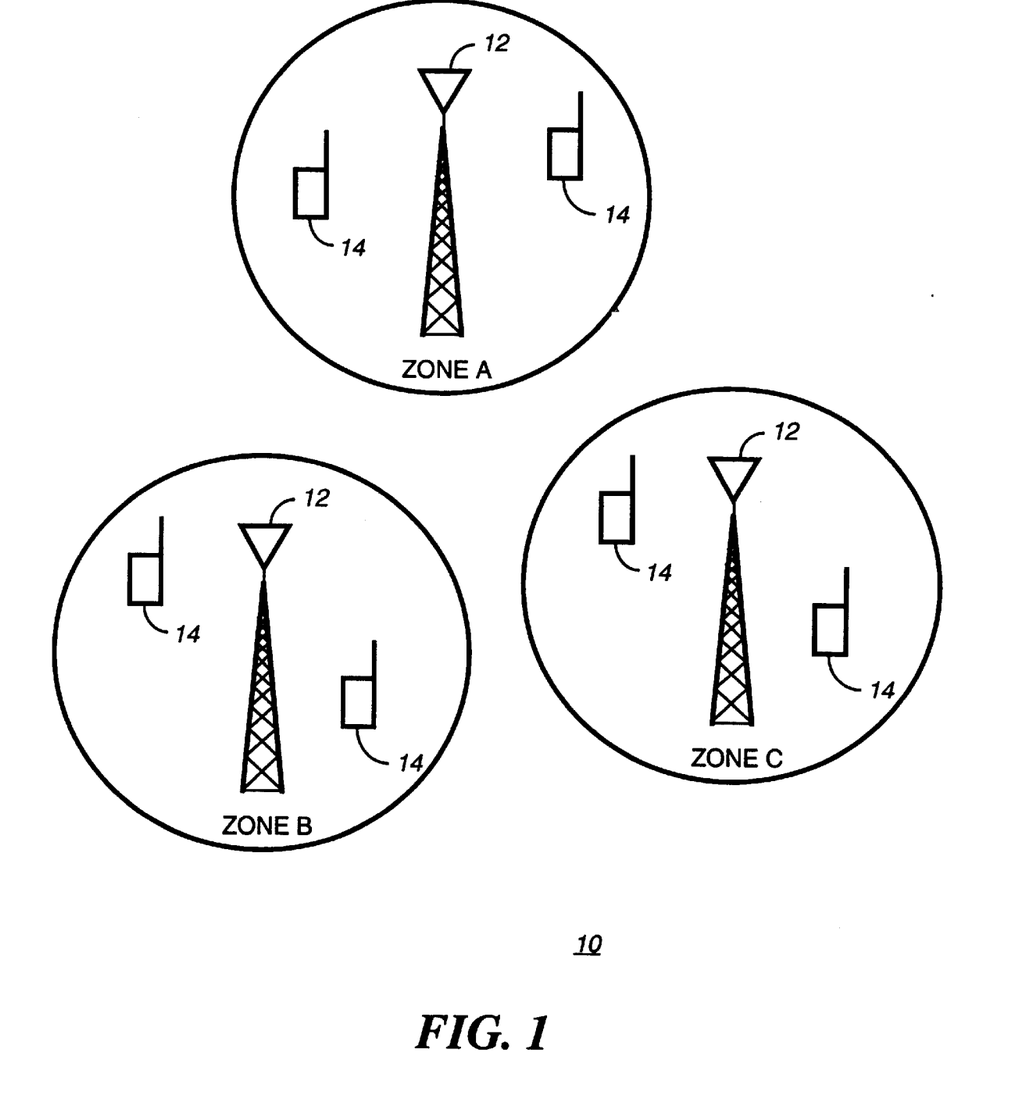
FIG. 1 illustrates a messaging system in which SUs can roam from zone to zone and receive message fragments from transmitters operating on different channels.

Referring to FIG. 1, an RF (Radio Frequency) messaging system 10 includes transmitters 12 located in zones A, B and C. SUs 14 in zone A receive messages from the transmitter in zone A on a particular channel (frequency). The transmitters in zones B and C transmit on different channels to SUs located in their respective zones.

As discussed previously, long messages are transmitted in fragments. A message that is to be transmitted to a targeted SU 14 in zone A is assigned a message number, divided into numbered fragments, and the fragments are transmitted in sequence by the transmitter in zone A. The same message, identified by the same message number, is simulcast by the transmitters in zones B and C after having been divided into fragments.

Figure 2:
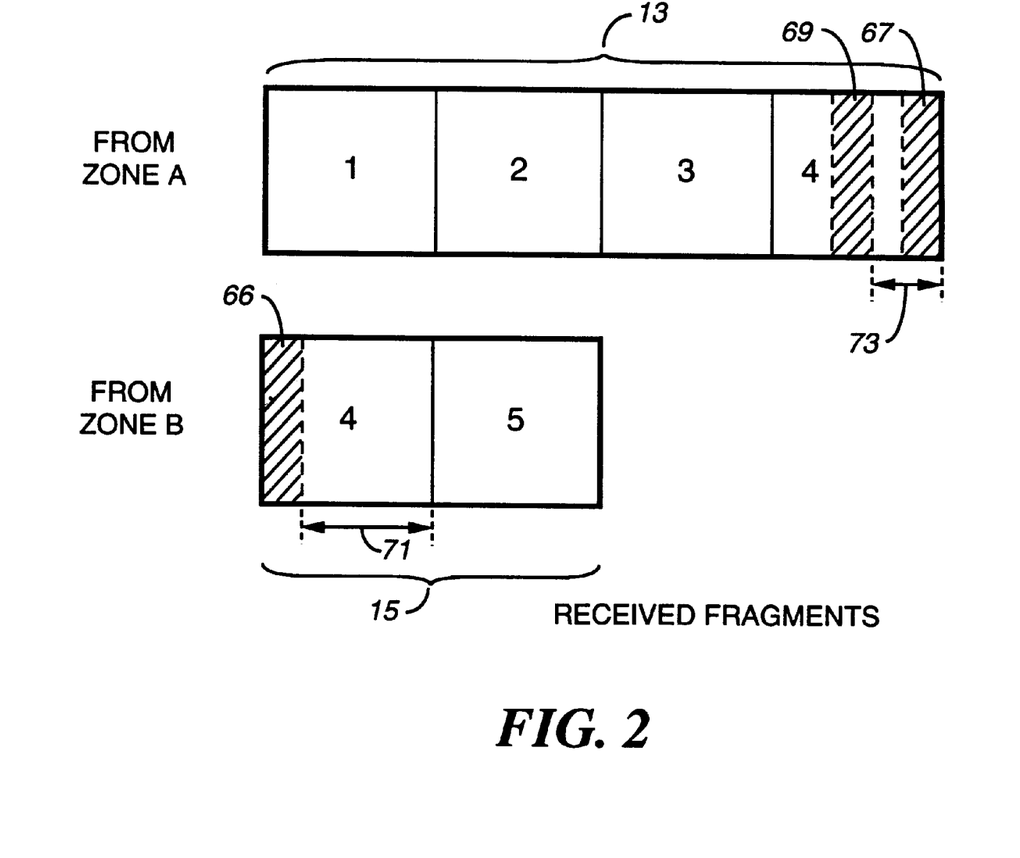
FIG. 2 depicts fragments of a message received by a SU from two different transmitters located in different zones and operating on different channels.

Assume that the targeted SU, located in zone A, is moving toward zone B, and that the message being sent to it contains five fragments. The targeted SU receives the first four fragments while it is in zone A, and then the SU moves to zone B. Meanwhile, the transmitter in zone A transmits the remaining fragments of the message, but the SU does not receive the remaining fragment from the transmitter in zone A because the SU moved into zone B, beyond the range of zone A's transmitter. This is depicted in FIG. 2 which shows that the targeted SU received fragments 1, 2, 3 and 4, which collectively form a partial message 13, from the transmitter in zone A. After receiving fragment number 4, the targeted SU left zone A and arrived in zone B.

In this example, the transmitter in zone B transmitted fragments 1, 2 and 3 while the targeted SU was still in zone A. The first fragment received by the targeted SU on the channel used in zone B is fragment number 4 which may duplicate some, but not necessarily all of, the information contained in fragment number 4 that was previously received when the SU was in zone A. The targeted SU then receives the remainder of the message, fragment 5, from the transmitter in zone B. Fragments 4 and 5 from zone B form another partial message 15.

Figure 3:
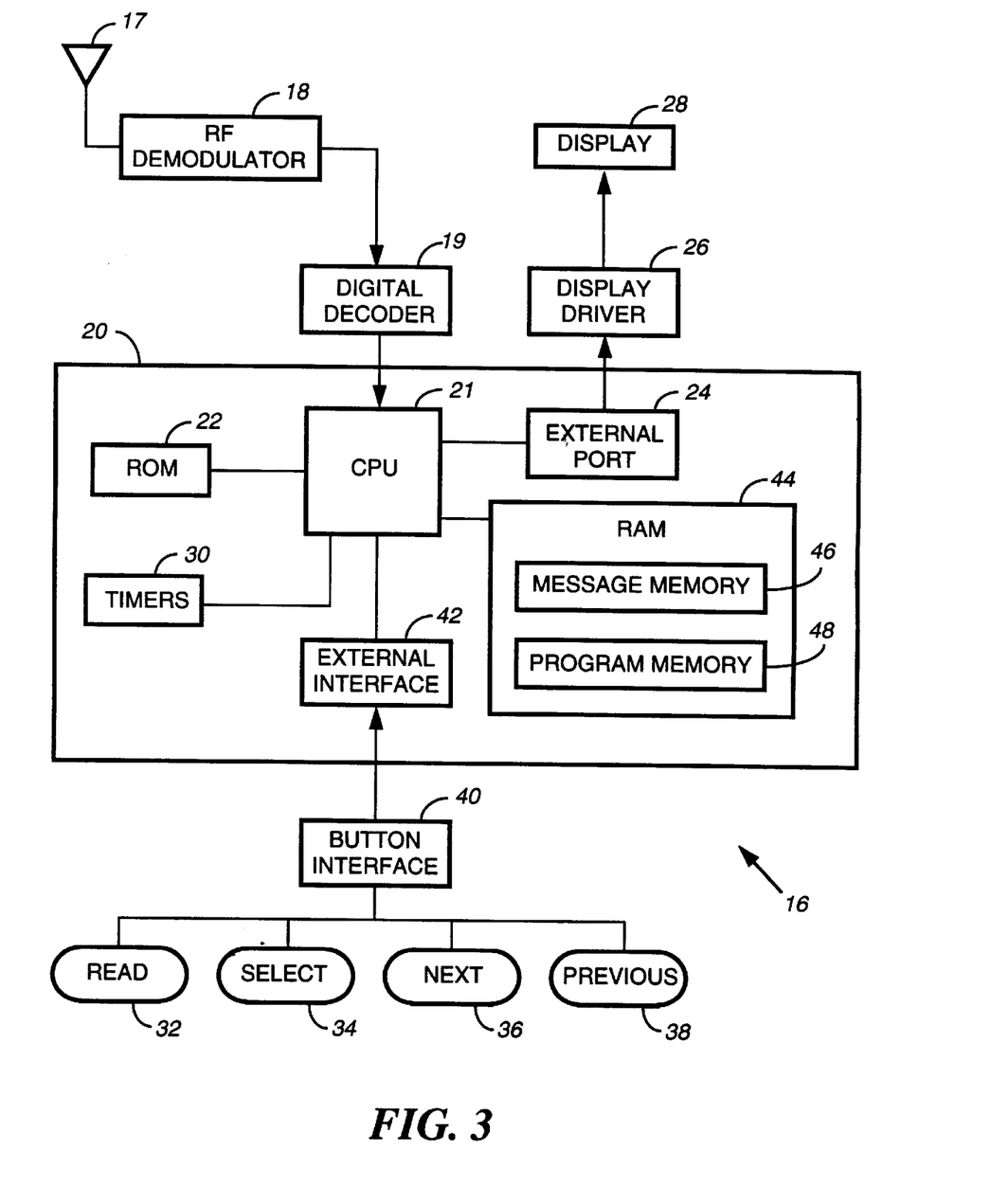
FIG. 3 is a block diagram of a SU that operates in accordance with the invention.

In this example, the targeted SU received two fragments numbered 4, one from zone A and one from zone B. Identically numbered fragments transmitted from different zones are likely to contain different information. With this invention, the SU is able to determine when it has received duplicate copies of the same information, to erase one copy of the duplicate information, and to combine the non-duplicated information to form a complete message. A SU that operates in this manner can be constructed of conventional components, and programmed to operate in accordance with the invention. Such a SU 16 is shown in FIG. 3.

The illustrated SU 16, shown in the form of a selective call receiver, has circuitry including an antenna 17, an RF demodulator 18 and a digital decoder 19 for receiving and decoding incoming messages. Messages received by the antenna 17 are demodulated by the conventional demodulator 18 to provide demodulated analog data as an input to the decoder 19 which may also be of conventional construction.

The signal output from the decoder 19 is applied as an input to a processor 20 which may be, for example, a MC68HC05 made by Motorola, Inc. The processor 20 may also be conventional, but it is programmed to cause the SU 16 to operate according the invention, as discussed later.

The processor 20 includes a CPU 21 and a ROM 22 which stores the instruction program for the CPU and other information that the SU 16 uses in accordance with a preferred aspect of the invention.

The processor also includes an external port interface 24 for coupling signals from the CPU 21 to a display driver 26. The latter device drives a display 28, which may be a conventional liquid crystal display, for displaying decoded messages.

Timers 30 are coupled to the CPU 21 to give a time base for collecting data from the decoder 19 at precise intervals.

The user may control various functions of the SU by means of user actuatable buttons entitled Read (32), Select (34), Next (36) and Previous (38) that are coupled to the CPU via a button interface 40 and an external port interface 42. The buttons may be used to cause a received message to be shown on the display 28, to scroll through messages, to exit reading messages, and various other conventional functions.

The processor 20 also includes a RAM (Random Access Memory) 44 that comprises a message memory 46 and a program memory 48. The program memory 48 acts as a scratch pad memory for temporary storage of new messages (before being stored in message memory 46) or the results of computations made by the CPU 21.

Figure 4:
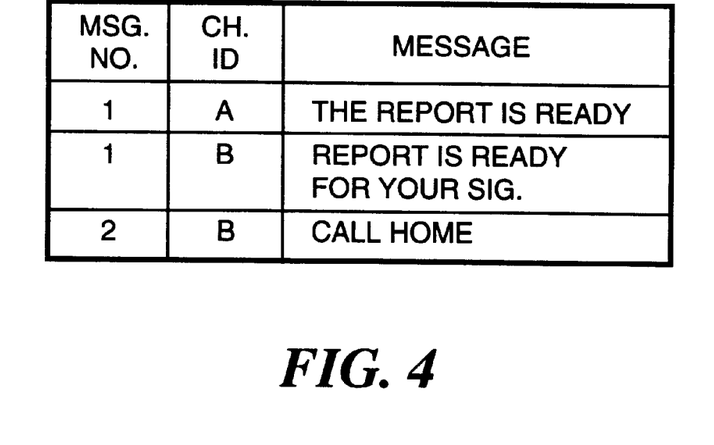
FIG. 4 illustrates how the memory of FIG. 3 stores information that is used in the preferred operation of the invention.

The CPU 21 is programmed to allow the SU 16 to operate in accordance with the invention in the following manner. The SU 16 receives at least a first fragment of a message from a transmitter operating on a first channel and located in a first zone, such as in zone A in FIG. 1. The SU stores the received fragments in memory. The SU then receives at least a second fragment of the same message from a transmitter operating on a second channel and located in a second zone, such as in zone B. Preferably, the fragment(s) received from the transmitter in the second zone are also stored in memory. The SU correlates at least some of the characters in the second fragment with characters in the first fragment to identify matching characters. If no match is found, this indicates that duplicate copies of a fragment were not received, and the SU combines the fragments received from the first and second zones as part of a message which can be shown on the display 28 (FIG. 3). If the SU finds duplicate information, it is deleted; non-duplicate fragments are combined to form a complete message. This technique allows SUs to roam from zone to zone while assembling fragments received from different transmitters into a complete message. It is particularly useful with selective call receivers that are not able to acknowledge receipt of message fragments The way in which the SU preferably stores message fragments in memory, and other aspects of the invention, will now be described with reference first to FIG. 4. The table shown in FIG. 4 represents part of the SU's memory, and preferably part of the memory 44 (FIG. 3). The illustrated table indicates that the SU 16 has received two messages, numbered 1 and 2, as indicated in the first column of the table. The table's second column indicates a channel ID (also referred to herein as a marker), and the third column holds the text of the received message fragments. In the illustrated example, a first part of message number 1 is a partial message that was received from a transmitter operating on a certain channel; the second part of message number 1 is a partial message that was received from a different transmitter operating on a different channel.

The SU knows the channel on which it is receiving a message, and it marks the fragments received on each channel with a marker or channel ID. In this case, the SU marked the first part of message number 1 as being from a transmitter operating on a channel identified as A. The second part of message number 1, being from a transmitter operating on a different channel, is marked as being from a transmitter operating on a channel identified as B. Thus, message fragments received on different channels are associated with different markers by the SU. The SU compares these markers to determine whether received message fragments were sent by transmitters operating in different zones. Note also that certain information in the partial message "The report is ready" is duplicated in the other partial message "report is ready for your signature". With this invention, that duplicate information is erased, and non-duplicated information is combined to form a complete message.

Referring back to FIG. 4, it can be seen that the SU 16 also received a complete short message, indicated as message number 2, from the same transmitter operating on the channel identified as B.

The use of markers to associate fragments of a message with a particular channel is used advantageously by the SU 16, as will now be described with reference to the flow chart shown in FIG. 5. The steps of the illustrated flow chart are preferably executed on a fragment-by-fragment basis, i.e., executed once for each received fragment.

In the first step 50, an incoming message is being received by the SU. If the message is short and not fragmented (step 52), the program proceeds to step 54 where the incoming message is processed conventionally (a proper alert is generated and the message is prepared for display).

If the incoming message is fragmented (as indicated by the status of a particular bit that is transmitted with the message), the program advances to step 56. At this point, a marker is applied to, or associated with, the message fragment being received, referred to herein as the "present" message fragment. For example, FIG. 4 shows marker A (designated as Ch. ID) applied to the initial fragment(s) of message number 1, and marker B applied to the remaining fragment(s) of message number 1.

Returning to FIG. 5, step 58 determines whether the message has other fragments that have been previously received. If the answer is No, this indicates that the fragment being examined is the first fragment of a new message, and the program advances to step 60 for storing the fragment.

If step 58 revealed that there were other fragments, step 62 is executed to determine whether those other fragments and the present fragment are all from the same channel or zone. This determination is made by comparing the marker associated with the previously received fragment to the marker that was associated with the present fragment per step 56.

If the present fragment and the previously received fragment of this message are from the same channel or zone, this indicates that all fragments of the message have been transmitted from the same zone. All the fragments are then combined (appended to each other) per step 59. The program then proceeds to step 61 to determine whether a complete message has been received. If the last fragment of the message has been received, the program advances to step 54 to prepare the message for display. If the last fragment has not been received, the program proceeds to step 60 to store the fragment or combined fragments, and await the arrival of the next fragment.

Referring back to step 62, if the markers of the present fragment and the previous fragment do not match, this indicates that the fragments are from different zones, and the program proceeds to step 62A. The SU determines whether all the previous fragments from this zone (the zone from which the present fragment was transmitted) have been combined per step 75 (FIG. 6). If they have been so combined as a result of an earlier pass through the program, then the program proceeds to step 59. All fragments are combined and, if the message is complete (step 61), the message is prepared for display per step 54.

Returning to step 62A, if all previous fragments from this zone have not been previously combined per step 75, then the program advances to step 63 where the SU combines fragments having the same markers. For example, in FIG. 2 the fragments 1–4 which constitute partial message 13 all have the same marker, so these fragments are combined. Likewise, fragments 4 and 5 of partial message 15 would be combined if they had also been received at this point in time.

In the next step 64 (FIG. 6), the SU determines whether this is the first attempt to correlate the information received in the present message. (Only one correlation using the next step 65 takes place for each message.) If the answer is "yes", the program proceeds to step 65.

At step 65, the SU compares a selected group of N (N is an integer which, in step 65, has been set equal to 10) characters in the present fragment to a similarly sized group of characters in the previous fragment(s), beginning with the last characters received in the previous fragment and working toward the beginning of the message, as will be described in more detail with reference to the example shown in FIG. 2.

Assume that the SU has received the fragments numbered 1–4 from zone A and only fragment number 4 from zone B. Upon executing step 62, the SU will have determined that one fragment 4 is from one zone and the other fragment number 4 is from a different zone. Fragments 1–4 from zone A are combined (step 63). Because this is the first attempt to correlate this message (step 64), the program proceeds to execute the comparison called for by step 65.

If fragment number 4 of partial message 15 is the present fragment when step 65 is executed, the first 10 characters of that fragment are preferably used in the comparison step. Those first 10 characters are identified by the cross-hatched area of fragment 4 that bears the reference number 66. The group of characters 66 is compared to a similar sized group of characters in the previous fragment, fragment number 4 of partial message 13, starting with the last 10 characters (reference number 67) of that previous fragment. That is, group 66 is compared to group 67 to determine whether they are identical. If no match is found, group 66 is compared to the next previous group of 10 characters in the same fragment. This comparison continues, working backward one character at a time, toward the beginning of partial message 13, until a match is found or until group 66 has been compared to the characters in every fragment of partial message 13. In the example shown in FIG. 2, it is assumed that a match is found when group 66 is compared to group 69.

Returning to FIG. 6, the SU now executes step 70 to determine if a correlation has been found. In the example shown in FIG. 2, a match was found between character groups 66 and 69. If no such match had been found, the program would proceed to step 68. Per step 68, no fragments are erased. All received fragments are kept separate until the entire message has been received and is ready to be displayed. At that point, the received fragments are appended to each other in the order of their reception.

If correlation is found when step 70 is executed, the program proceeds to step 72 where additional comparison occurs. In general, if a match is found between a selected group of characters (e.g., group 66) in one fragment and a similarly sized group of characters (e.g., group 69) in a fragment from a different partial message, then the remaining characters in the one fragment are compared to the remaining characters in the fragment from the other partial message to determine if there is a complete match between fragments. Referring to FIG. 2, if a match is found between character group 66 and character group 69, then step 72 requires that the correlation be expanded to the end of the previous message fragment, i.e. that the remaining characters 71 in fragment number 4 of partial message 15 be compared, as a group, to the remaining characters 73 in fragment number 4 of partial message 13. If a complete match is not found for all the remaining characters 73 in partial message 13 (step 74), the program returns to step 68. If a complete match is not found, this indicates that fragment 4 of partial message 13 is not duplicated in partial message 15. No characters are erased.

Figure 5:
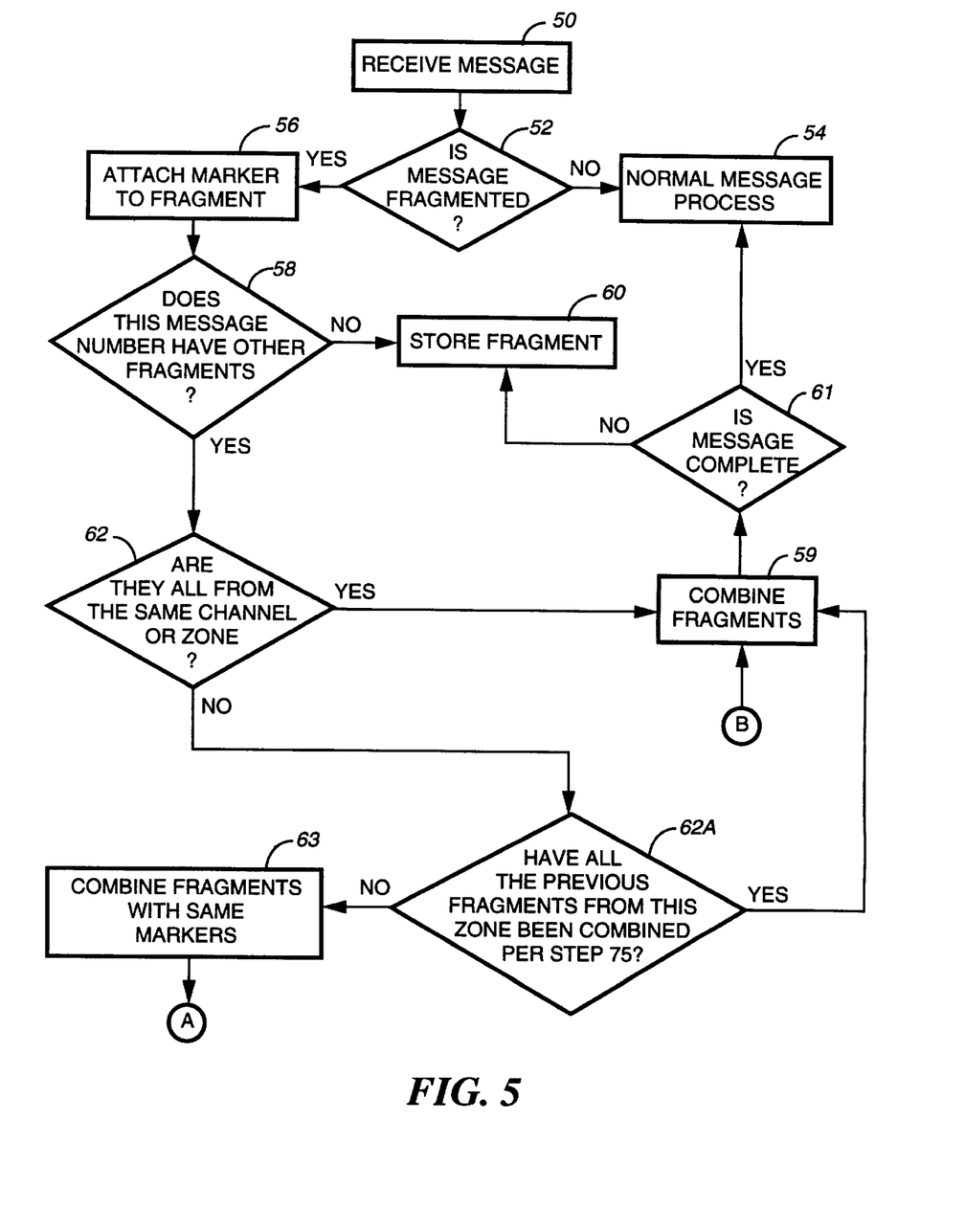
FIGS. 5 and 6 constitute a flow chart showing how the CPU (Central Processing Unit) of FIG. 3 is preferably programmed to cause the SU to operate in accordance with the invention.
Figure 6:
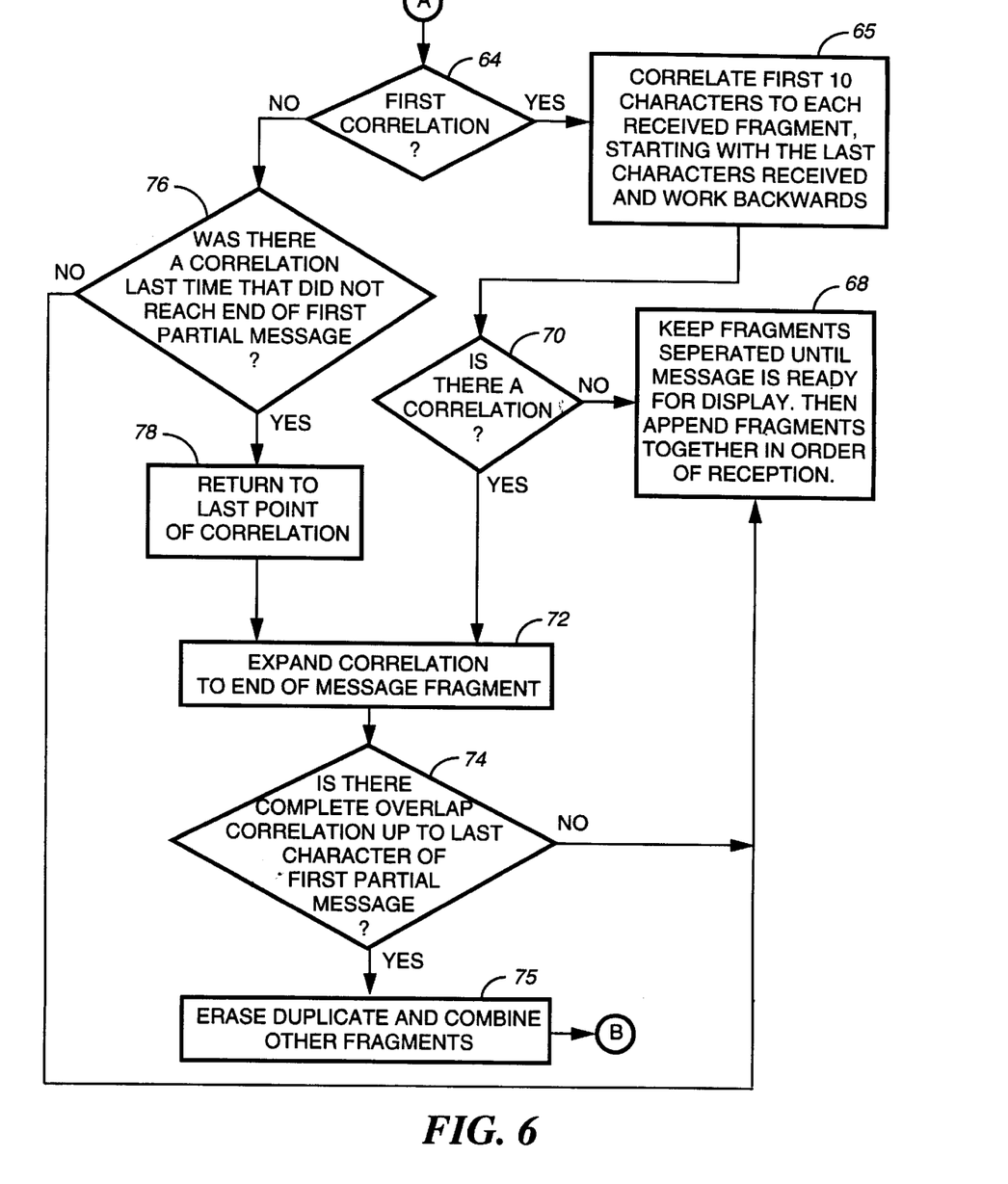

If a complete match is found (step 74) for every character in character group 69 and for every character in remaining characters 73, then the program proceeds to step 75 where one copy of the duplicate characters is erased; the other fragments of the message are combined to form a message, and the program proceeds to step 59 (FIG. 5).

If the execution of step 74 does not reveal the complete overlap that is looked for, the program proceeds to step 68. No further attempt to correlate the partial messages will be made for this particular message.

Returning to step 64, if the correlation called for in step 65 had been attempted, but no match had been found, then upon receipt of the next fragment, the program would again execute steps 50 to 63 and then step 64. Because this is not the first correlation, the program proceeds to step 76 where the SU determines whether, on the last pass through this program, correlation was found when step 65 was executed, but incomplete correlation was found when step 72 was executed. In FIG. 2, for example, if a match was found between group 66 and a group of characters (e.g., group 69) in any fragment of partial message 13, did all the remaining characters located between group 69 and the end of partial message 13 also find an identical match in partial message 15? If a match was found with all the characters up to the end of partial message 13, then the answer to the question in step 76 is NO and the program proceeds to step 68. If the answer found at step 76 is "Yes", this means that there are additional characters in partial message 13 that need to be examined for correlation. This condition occurs, for example, when character group 66 finds a match with a group of characters in fragment 3 of partial message 13, and the remaining characters 71 are matched to the next 10 characters in partial message 13, but there are additional characters toward the end of partial message 13 for which no match has been attempted. In that case, the program proceeds to step 78.

At step 78, we return to the point in partial message 13 where correlation was last found. For example, if fragment 4 of partial message 15 perfectly overlaps the last half of fragment 3 and the first half of fragment 4 of partial message 13, then steps 78 and 72 cause correlation to be attempted between fragment 5 and the last half of fragment 4. If a complete overlap (match) is found (step 74), duplicate information is erased and the non-duplicated information is combined (step 75). This process continues until the last fragment of the message has been received and correlation has been attempted, whereupon step 59 is executed. All non-erased fragments are then appended in the order of their reception, and the corrected message is ready to be displayed.

There will be situations where at least one character is not properly decoded, and an error indicator will take the place of the missing, undecoded character. It is preferred that any such error be considered as a match with any character that it is compared to for purposes of carrying out this invention.

It will be appreciated that the present method of compiling message fragments allows SU's in a one-way messaging system to roam from zone to zone, and yet properly compile a message without duplicating information. All that is required is a modification to the SU's software program as described above. No modification is required to the messaging system's infrastructure.

Although the invention has been described in terms of a preferred embodiment, it will be obvious to those skilled in the art that various modifications and alterations may be made without departing from the invention. Accordingly, it is intended that all such alterations and variations be considered as within the spirit and scope of the invention as defined by the appended claims.

What is claimed is:

1. In a messaging system wherein long messages are divided into fragments each containing a plurality of characters, and wherein the fragments are transmitted to subscriber units that can roam from one zone to another zone, a method for a subscriber unit to compile a complete message, comprising:

receiving at least a first fragment of a message from a transmitter located in a first zone;

associating a first marker with the first fragment;

storing the first fragment and the marker in memory;

receiving at least a second fragment of the message from a transmitter located in a second zone;

associating a second marker with the second fragment;

storing the second fragment and the second marker in memory; and comparing the first marker to the second marker to determine if the first and second fragments are from different zones, and if the first marker is different from the second marker correlating at least some characters of the second fragment with characters in the first fragment to identify matching characters, and if no match is found, combining the first and second fragments as part of a message.

2. A method as set forth in claim 1 wherein, if a complete match is found between at least N characters in the first and second fragments, additional correlating is effected to identify additional matching characters.

3. A method as set forth in claim 1 wherein the transmitter in the first zone transmits on a first channel, wherein the transmitter in the second zone transmits on a second channel, and wherein the first and second fragments are associated with different markers in response to their having been transmitted on different channels.

4. A method as set forth in claim 1 wherein the first fragment is part of a first partial message transmitted from the first zone, wherein the second fragment is part of a second partial message transmitted from the second zone, and wherein the step of correlating includes:

comparing a selected group of characters in the second fragment to similarly sized groups of characters in the first fragment, beginning at one end of the first partial message and working toward an opposite end of the first partial message until a match is found between groups of characters.

5. A method as set forth in claim 4 wherein the selected group of characters in the second fragment comprises the first "N" characters of the second partial message, where "N" is an integer.

6. A method as set forth in claim 5 wherein "N" is ten.

7. A method as set forth in claim 4 wherein if a matching group of characters is found in the first partial message as a result of the comparing step, all remaining characters of the first partial message that are located between the matching group of characters and the end of the first partial message are compared to characters in the second partial message.

8. A method as set forth in claim 7 wherein, if a match is found with the remaining characters, one copy of matching characters is deleted.

9. In a messaging system wherein long messages are divided into fragments each containing a plurality of characters, and wherein the fragments are transmitted to subscriber units that can roam from one zone to another zone, a method for a subscriber unit to compile a complete message, comprising:

receiving at least a first fragment of a message from a transmitter located in a first zone and transmitting on a first channel;

associating a first marker with the first fragment;

receiving at least a second fragment of the message from a transmitter located in a second zone and transmitting on a second channel;

associating a second marker with the second fragment;

if the first marker is different from the second marker, correlating at least some characters of the second fragment with characters in the first fragment to identify matching characters; and if a complete match is found between the first and second fragments, deleting one of the fragments.

10. A method as set forth in claim 9 including combining the first and second fragments as part of a message if no match is found.

11. A method as set forth in claim 10 wherein the first fragment is part of a first partial message transmitted from the first zone, wherein the second fragment is part of a second partial message transmitted from the second zone, and wherein the step of correlating includes:

comparing a group of N characters in the second fragment to groups of N characters in the first fragment, beginning at one end of the first partial message and working toward an opposite end of the first partial message.

12. A method as set forth in claim 11 wherein if a matching group of characters is found in the first partial message as a result of the comparing step, all remaining characters of the first partial message that are located between the matching group of characters and the end of the first partial message are compared to characters in the second partial message.

13. In a messaging system wherein long messages are divided into fragments each containing a plurality of characters, and wherein the fragments are transmitted to subscriber units that can roam from one zone to another zone, a method for a subscriber unit to compile a complete message, comprising:

receiving at least a first fragment of a message from a transmitter located in a first zone and transmitting on a first channel;

associating a first marker with the first fragment;

receiving at least a second fragment of the message from a transmitter located in a second zone and transmitting on a second channel;

associating a second marker with the second fragment;

if the first marker is different from the second marker, comparing the first "N" characters in the second fragment to groups of "N" characters in the first fragment, beginning with the last characters received in the first fragment and working toward the first characters received in the first fragment to identify matching characters;

if N duplicate characters are found, comparing other characters in the first fragment to characters in the second fragment; and if a match is found between all other characters in the first fragment and duplicate characters in the second fragment, erasing duplicate characters.

\* \* \* \* \*